United States Patent
Sakamoto et al.

(10) Patent No.: US 9,013,179 B2
(45) Date of Patent: Apr. 21, 2015

(54) ANGLE DETECTING DEVICE

(75) Inventors: Yoshiki Sakamoto, Kitasaku-gun (JP);
Wataru Nogamida, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 380 days.

(21) Appl. No.: 13/397,126

(22) Filed: Feb. 15, 2012

(65) Prior Publication Data

US 2012/0249127 A1 Oct. 4, 2012

(30) Foreign Application Priority Data

Mar. 28, 2011 (JP) .................................. 2011-069517

(51) Int. Cl.
*G01B 7/30* (2006.01)
*G01R 33/06* (2006.01)
*G01D 5/244* (2006.01)
*G01D 5/245* (2006.01)

(52) U.S. Cl.
CPC ............ *G01D 5/24471* (2013.01); *G01D 5/245* (2013.01)

(58) Field of Classification Search
CPC ..... G01D 3/08; G01D 5/245; G01D 5/24471; G01D 5/2451; G01L 3/101
See application file for complete search history.

(56) References Cited

U.S. PATENT DOCUMENTS

| | | | | |
|---|---|---|---|---|
| 4,988,945 A | * | 1/1991 | Nagase | 324/175 |
| 6,078,851 A | * | 6/2000 | Sugitani | 701/30.6 |
| 6,137,287 A | * | 10/2000 | Ichihashi | 324/160 |
| 2005/0279180 A1 | * | 12/2005 | Aokii et al. | 73/862.325 |
| 2009/0315544 A1 | * | 12/2009 | Takahashi et al. | 324/207.25 |
| 2011/0121824 A1 | * | 5/2011 | Sterling | 324/207.22 |
| 2013/0282239 A1 | * | 10/2013 | Ura | 701/41 |

FOREIGN PATENT DOCUMENTS

| JP | A-2002-081961 | 3/2002 |
|---|---|---|
| JP | A-2006-250864 | 9/2006 |
| JP | A-2007-333658 | 12/2007 |
| JP | A-2009-098028 | 5/2009 |

* cited by examiner

*Primary Examiner* — Melissa Koval
*Assistant Examiner* — Courtney McDonnough
(74) *Attorney, Agent, or Firm* — Oliff PLC (57) ABSTRACT

A VR resolver 120 and an MR sensor 114 are mounted to a shaft 103. The VR resolver 120 and the MR sensor 114 are formed so as to have a shaft angle multiplier of not less than 2. The difference of the shaft angle multiplier between the VR resolver 120 and the MR sensor 114 is made to be 1. An absolute angle of the shaft 103 is calculated based on a difference between an angle calculated from an output of the VR resolver 120 and an angle calculated from an output of the MR sensor 114. Since the VR resolver 120 and the MR sensor 114 have a different failure mode, redundancy against failure is reliably obtained.

7 Claims, 5 Drawing Sheets

ANGLE DETECTING DEVICE

BACKGROUND OF THE INVENTION

1. Field of the Invention

The present invention relates to an angle detecting device that detects an absolute angle and that has high safety and high reliability.

2. Description of Related Art

An angle detecting device is disclosed in, for example, Japanese Unexamined Patent Application Laid-open No. 2006-250864. This angle detecting device is constructed by combining two of the same type of angle detectors so as to improve redundancy against failure.

The angle detecting device is required to have a function for detecting an absolute angle. The absolute angle is a value of an angle of a rotating shaft of which a rotation angle is a detection target. For example, a resolver with a shaft angle multiplier of 2× outputs signals of two cycles per rotation of a rotating shaft. That is, a data of a rotation angle is obtained at two rotational positions of the rotating shaft (in this case, at angular positions which differ by 180°). Accordingly, an actual rotation angle (that is, an absolute angle) cannot be determined from the data only by the output of the resolver with the shaft angle multiplier of 2×. As in the case just described, in a case in which an angular data obtained from an angle detecting means does not correspond one-to-one with an actual rotation angle, the actual rotation angle of the rotating shaft is called an "absolute angle" in order to differentiate between them.

As an angle detector that detects an absolute angle, a resolver with a shaft angle multiplier of 1× is known. The resolver with the shaft angle multiplier of 1× outputs sine signals and cosine signals of one cycle per rotation, and therefore, an absolute angle can be detected.

In a case of combining the same type of angle detectors, since failure modes thereof are the same, if one of the angle detector has broken down, a probability of the other breaking down is high. Therefore, although the redundancy against failure is improved, the reliability is not high. On the other hand, in a case of using the resolver with the shaft angle multiplier of 1×, an absolute angle can be detected, but detection error is large in principle. Therefore, this resolver is not suitably used for detecting an angle at high accuracy.

SUMMARY OF THE INVENTION

In view of these circumstances, it is an object of the present invention to provide a technique for detecting an absolute angle at high accuracy, in which redundancy against failure is high, and functional safety is obtained by detecting error.

According to one aspect of the present invention, the present invention provides an angle detecting device for detecting an angle of a rotating shaft, and the angle detecting device includes a first angle detector and a second angle detector. The first angle detector is of a different type from the second angle detector.

According to a second aspect of the present invention, in the first aspect of the present invention, the first angle detector is a resolver with a shaft angle multiplier of not less than 2×, and the second angle detector is an MR (Magnetoresistive) sensor with a shaft angle multiplier of not less than 2×.

According to a third aspect of the present invention, in the first aspect of the present invention, a difference of the shaft angle multiplier between the first angle detector and the second angle detector is 1.

According to a fourth aspect of the present invention, in the third aspect of the present invention, the angle detecting device further includes a signal processing section. The signal processing section has a calculating unit for calculating an absolute angle of a rotation angle of the rotating shaft based on a difference between a first angle and a second angle. The first angle is calculated from an output of the resolver, and the second angle is calculated from an output of the MR sensor.

According to a fifth aspect of the present invention, in the fourth aspect of the present invention, the signal processing section includes two microcomputers that monitor mutual operation and output signals.

According to a sixth aspect of the present invention, in the fifth aspect of the present invention, the signal processing section outputs an error signal when at least one of the signals output from the two microcomputers is abnormal.

According to a seventh aspect of the present invention, in the fourth aspect of the present invention, the calculating unit performs a first process by subtracting the second angle from the first angle when the shaft angle multiplier of the first angle detector is greater than that of the second angle detector. In addition, the calculating unit performs a second process by subtracting the first angle from the second angle when the shaft angle multiplier of the second angle detector is greater than that of the first angle detector. The calculating unit outputs results of the first process and the second process as an absolute angle of the rotation angle of the rotating shaft when the results are zero or positive. The calculating unit adds 360° to results of the first process and the second process when the results are negative, and outputs the obtained values as an absolute angle of the rotation angle of the rotating shaft.

According to an eighth aspect of the present invention, in the seventh aspect of the present invention, the calculating unit calculates the following first formula. In the first formula, "A" represents an absolute angle with high accuracy, "a" represents the absolute angle obtained by the calculating unit, "n" represents the shaft angle multiplier of the angle detector with relatively higher accuracy, and "b" represents an angle calculated from an output of the angle detector with relatively higher accuracy. In addition, "QUOTIENT" represents a function for showing only an integer by truncating the decimal part of a quotient.

$$A = \{QUOTIENT(a/360/n) \times 360 + b\}/n \qquad \text{First Formula}$$

According to the eighth aspect of the present invention, an absolute angle with further high accuracy is obtained.

According to a ninth aspect of the present invention, in the first aspect of the present invention, the first angle detector and the second angle detector have a coaxial structure and use the same shaft. According to the ninth aspect of the present invention, an angle detecting device having a simple structure and redundancy against failure is obtained.

According to the present invention, a technique for detecting an absolute angle at high accuracy is provided. In the technique, redundancy against failure is high, and functional safety is obtained by detecting error.

PREFERRED EMBODIMENTS OF THE INVENTION

Figure 1:
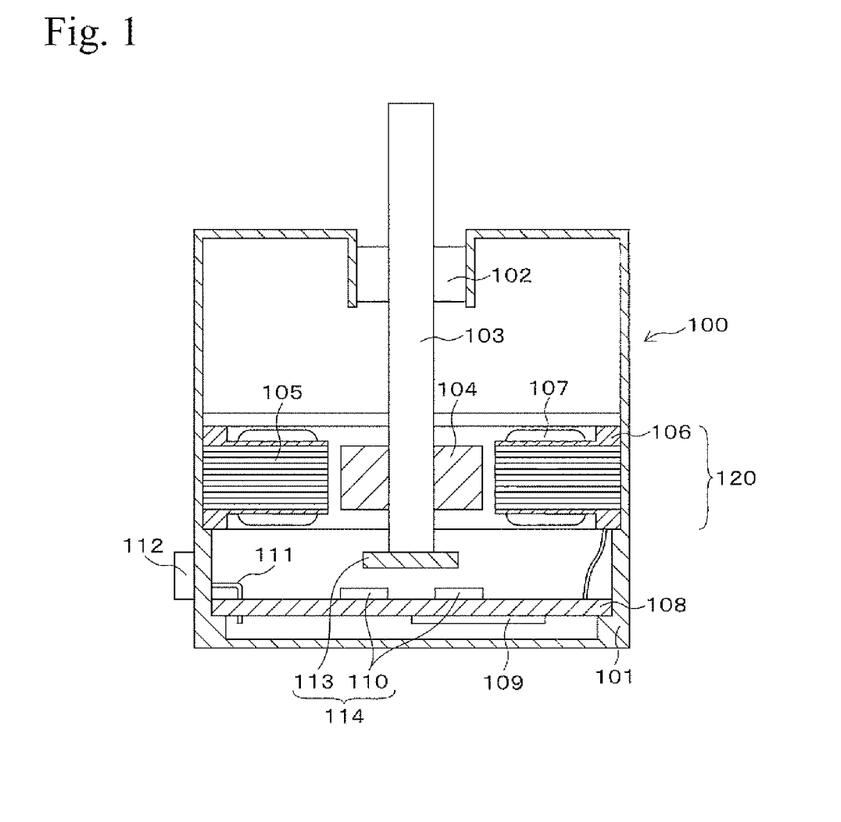
FIG. 1 is a sectional view of an angle detecting device of an embodiment.

FIG. 1 shows an angle detecting device 100 of an embodiment. The angle detecting device 100 is constructed by combining a VR (Variable Reluctance) resolver 120 and an MR sensor 114. The VR resolver 120 has a shaft angle multiplier of 3×. The MR sensor 114 has a shaft angle multiplier of 2×. The angle detecting device 100 is contained in a case 101. The case 101 rotatably holds a shaft 103 via a bearing 102. The shaft 103 is a rotating shaft, of which a rotation angle is a detection target. The shaft 103 is mounted with a resolver rotor 104 and a magnet 113 of the MR sensor 114. The resolver rotor 104 is made of a magnetic material and has a cross sectional shape in the axial direction, in which a projection as a magnetic pole is equiangularly provided to three positions at a circumference. This cross sectional shape is due to the shaft angle multiplier of 3×. The resolver rotor 104 has the same structure as that of an ordinary VR resolver with a shaft angle multiplier of 3×.

A resolver stator 105 is arranged at a position opposite to the resolver rotor 104 with a space therebetween. The resolver stator 105 is made of a soft magnetic material and has plural pole teeth that extend toward the resolver rotor 104. The resolver stator 105 is held by an insulator 106 and is fixed to an inside of the case 101. Each of the pole teeth of the resolver stator 105 is wound with a coil 107. The coil 107 includes an exciting winding, a sine-wave output winding, and a cosine-wave output winding. The sine-wave output winding is wound so as to output voltage of the phase that is different from that of the cosine-wave output winding by 90°. These structures of the stator side are the same as those of a stator side in an ordinary VR resolver with a shaft angle multiplier of 3×. The shaft 103, the resolver rotor 104, the resolver stator 105, the insulator 106, and the coil 107 form the VR resolver 120.

The windings of the coil 107 are connected to a circuit board 108. The circuit board 108 is mounted to the inside of the case 101 and is equipped with a microcomputer 109 and other circuits, which will be described later. The circuit board 108 is also equipped with a connector terminal 111, and the connector terminal 111 is connected to a connector 112 that is exposed to the outside of the case 101. Electricity is supplied from the connector 112 to the circuit board 108, whereas various output signals are output from the connector 112 to the outside. The output signal includes data regarding a rotation angle of the shaft 103.

The magnet 113 is mounted on an end of the shaft 103 and has a flat shape in a front direction as shown in FIG. 1. The magnet 113 has a two-pole structure of a north pole and a south pole, which have a semicircular shape in the axial direction. Two MR sensor elements 110 are arranged on the circuit board 108 at a position opposite to the magnet 113 in the axial direction. These two MR sensor elements 110 and the magnet 113 form the MR sensor 114 with the shaft angle multiplier of 2×. The MR sensor 114 is formed by using the shaft 103 of the VR resolver 120. That is, the MR sensor 114 has a coaxial structure using the shaft of the VR resolver 120.

Figure 2:
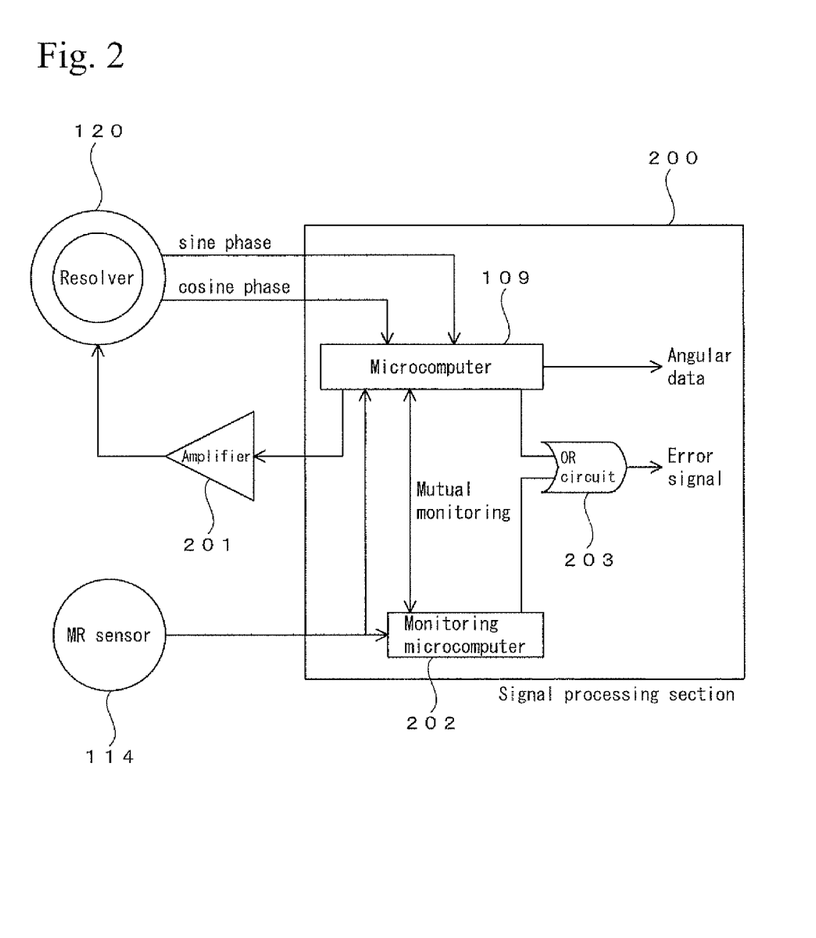
FIG. 2 is a block diagram showing an electric system structure.

FIG. 2 is a block diagram showing an electrical structure of the angle detecting device 100. FIG. 2 shows an amplifier 201, a monitoring microcomputer 202, and an OR circuit 203, and although not shown in FIG. 1, they are mounted on the circuit board 108. The microcomputer 109 receives output of sine phase and cosine phase from the resolver 120, and also receives output of the MR sensor 114. The microcomputer 109 performs a process, which will be described below, based on these input signals and calculates an angular data of the shaft 103. The microcomputer 109, the monitoring microcomputer 202, and the OR circuit 203 form a signal processing section 200.

The microcomputer 109 outputs exciting current, and the exciting current is amplified by the amplifier 201 and is supplied to the resolver 120. The microcomputer 109 receives the output of sine phase and cosine phase from the resolver 120. The microcomputer 109 also receives the output of the MR sensor 114. The monitoring microcomputer 202 receives the output of the MR sensor 114. The microcomputer 109 and the monitoring microcomputer 202 mutually monitor operation thereof. The OR circuit 203 receives a signal of normal operation of the resolver 120 from the microcomputer 109 and receives a signal of normal operation of the MR sensor 114 from the monitoring microcomputer 202. The OR circuit 203 outputs an error signal when at least one of these signals is abnormal.

Figure 3:
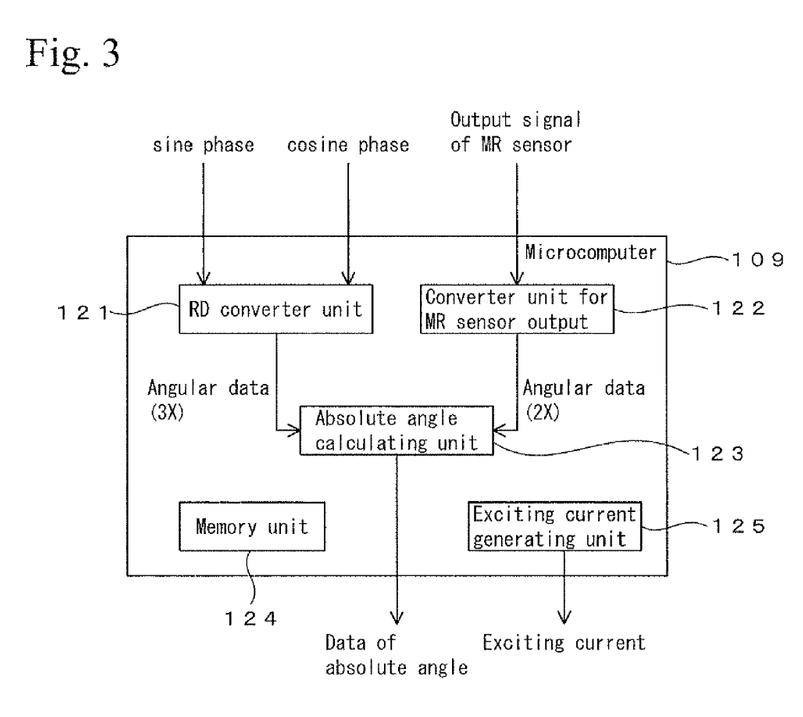
FIG. 3 is a block diagram of an inside of a microcomputer.

The microcomputer 109 in FIGS. 1 and 2 will be described hereinafter. FIG. 3 is a block diagram showing a schematic structure of the microcomputer 109. The microcomputer 109 is a circuit with a function as a programmable computer. An RD (Resolver-Digital) converter unit 121, a converter unit 122 for MR sensor output, and an absolute angle calculating unit 123 are programmed in the microcomputer 109. A part or the entirety of these functional units may be formed of specialized hardware. In addition, these functional units may be made of a programmable logic device such as a FPGA (Field-Programmable Gate Array). The microcomputer 109 includes a memory unit 124 and an exciting current generating unit 125. The memory unit 124 stores programs for operating the functional units and stores various data that are necessary for calculation in the microcomputer 109. The memory unit 124 provides a memory region that is necessary for the calculation in the microcomputer 109 and stores results of the calculation. The exciting current generating unit 125 generates periodic waveform of exciting current and outputs it to the amplifier 201 shown in FIG. 2.

The RD converter unit 121 calculates angular data of the rotation angle of the shaft 103 based on the output signals of sine phase and cosine phase that are obtained from the sine-wave output winding and the cosine-wave output winding of the coil 107. This process is the same as a signal process for an ordinary VR resolver with a shaft angle multiplier of 3×.

The process relating to the RD converter unit 121 will be briefly described hereinafter. First, exciting current of several kilohertz to several hundred kilohertz is supplied to the exciting winding. In this condition, when the resolver rotor 104 rotates, a gap between the pole teeth of the resolver stator 105 and the resolver rotor 104 varies in accordance with change of a rotation angle of the resolver rotor 104. This is because the resolver rotor 104 has the three projections in the axial direction. In this case, if the rotation angle of the resolver rotor 104 is represented as $\theta$, and the exciting current is $\sin \omega t$, a waveform of $\sin \theta \sin \omega t$ is obtained from the sine-wave output winding, and a waveform of $\cos \theta \sin \omega t$ is obtained from the cosine-wave output winding. The RD converter unit 121 calculates $\theta$ based on the waveforms of $\sin \theta \sin \omega t$ and $\cos \theta \sin \omega t$. In the case of the VR resolver with the shaft angle multiplier of 3×, output of three cycles are obtained while the shaft 103 rotates once. Therefore, as described later, the value of $\theta$ calculated by the RD converter unit 121 does not correspond to the actual rotation angle (absolute angle) of the shaft.

The converter unit 122 calculates angular data of the rotation angle of the shaft 103 based on change in resistance of the MR sensor elements 110. The process performed by the converter unit 122 is the same as a signal process for an ordinary MR sensor with a shaft angle multiplier of 2×.

The process relating to the converter unit 122 will be briefly described hereinafter. When the magnet 113 rotates, positional relationships between the magnetic poles of the magnet 113 and each of the two MR sensor elements 110 are changed. These changes are detected as changes in resistance of the MR sensor elements 110. The change in resistance is different in each of the two MR sensor elements 110, and as in the case of the VR resolver 120, two kinds of periodic waveforms that have a different phase are obtained. The two periodic waveforms include data regarding a rotation angle of the magnet 113, and the converter unit 122 calculates the rotation angle of the magnet 113 based on the two periodic waveforms. In this case, the MR sensor 114 with the shaft angle multiplier of 2× provides output of two cycles while the shaft 103 rotates once. Therefore, the angle value calculated by the converter unit 122 does not correspond to the actual rotation angle (absolute angle) of the shaft.

Figure 4:
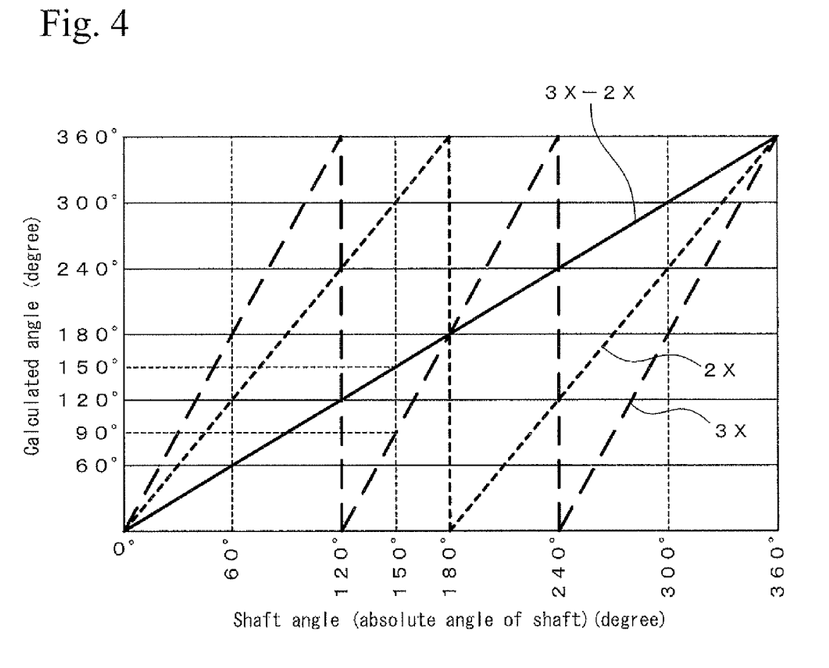
FIG. 4 is a graph showing a relationship between shaft angle and calculated angle that is obtained by a converter.

FIG. 4 shows a relationship between the shaft angle and the calculated angles obtained by the converter units. FIG. 4 shows a horizontal axis corresponding to absolute angle of the rotation angle of the shaft 103. FIG. 4 shows a vertical axis corresponding to angular data of the rotation angle of the shaft 103. The angular data are output from the RD converter unit 121 (represented as 3×), output from the converter unit 122 (represented as 2×), and output from the absolute angle calculating unit 123 (represented as 3×−2×).

As shown in FIG. 4, the angular data (3×) of three cycles are obtained from the resolver 120 with the shaft angle multiplier of 3× while the resolver rotor 104 rotates once. That is, when the resolver rotor 104 rotates once, sine waveforms and cosine waveforms of three cycles are obtained, and the rotation angle of the resolver rotor 104 is calculated based on them. In this case, corresponding to the calculated angle, shaft angle shown by the horizontal axis is obtained three times per rotation of the resolver rotor 104 as an actual shaft angle (absolute angle). Therefore, the absolute angle cannot be determined only by the output of the resolver 120 with the shaft angle multiplier of ×.

For example, a value of 180° may be obtained by the RD converter unit 121 based on the output of the resolver 120 with the shaft angle multiplier of 3×. In this case, as shown in FIG. 4, the actual shaft angle (absolute angle of the rotation angle of the shaft 103) is one of 60°, 180°, and 300°. That is, the actual angle (that is, absolute angle) cannot be determined from the three angles only by the output from the RD converter unit 121. An absolute angle is detected as a rotation angle from a predetermined angular position of a reference. The angular position is preliminarily selected as a reference.

On the other hand, as shown in FIG. 4, the angular data (2×) of two cycles are obtained from the MR sensor 114 with the shaft angle multiplier of 2× while the magnet 113 rotates once. In this case, corresponding to a calculated angle, shaft angle shown by the horizontal axis is obtained two times per rotation of the magnet 113 as an actual shaft angle (absolute angle). Therefore, the absolute angle cannot be determined only by the output of the MR sensor 114 with the shaft angle multiplier of 2×.

For example, a value of 240° may be obtained by the converter unit 122 based on the output of the MR sensor elements 110 of the MR sensor 114 with the shaft angle multiplier of 2×. In this case, as shown in FIG. 4, the actual shaft angle (absolute angle of the rotation angle of the shaft 103) is one of 120° and 300°. That is, the actual angle (that is, absolute angle) cannot be determined from the two angles only by the output from the converter unit 122.

The absolute angle calculating unit 123 in FIG. 3 calculates the difference between a calculated value (3×) and a calculated value (2×) of the rotation angle of the shaft 103. The calculated value (3×) is output from the RD converter unit 121, and the calculated value (2×) is output from the converter unit 122. Then, the absolute angle calculating unit 123 calculates an absolute angle of the rotation angle of the shaft 103 based on the result. In this case, the difference of (3×−2×) is calculated. If the result is not less than zero, the absolute angle calculating unit 123 outputs the result as an absolute angle of the rotation angle of the shaft 103. On the other hand, if the result is negative, the absolute angle calculating unit 123 adds 360° to the result and outputs the obtained value as an absolute angle of the rotation angle of the shaft 103. This process is performed according to an operation program stored in the memory unit 124. This operation program may be stored in an appropriate memory medium and may be executed by downloading it therefrom.

A practical example of the process performed by the absolute angle calculating unit 123 will be described hereinafter. For example, a calculated value (3×) of the rotation angle of the shaft 103 output from the RD converter unit 121 may be 180°, and a calculated value (2×) of the rotation angle of the shaft 103 output from the converter unit 122 may be 120°. In this case, (3×−2×)=60° is calculated as an absolute angle of the rotation angle of the shaft 103.

For example, a calculated value (3×) of the rotation angle of the shaft 103 output from the RD converter unit 121 may be 90°, and a calculated value (2×) of the rotation angle of the shaft 103 output from the converter unit 122 may be 300°. In this case, (3×−2×)=−210°. Therefore, 360° is added to this value, whereby 150° is calculated as an absolute angle of the rotation angle of the shaft 103.

For example, a calculated value (3×) of the rotation angle of the shaft 103 output from the RD converter unit 121 may be 180°, and a calculated value (2×) of the rotation angle of the shaft 103 output from the converter unit 122 may be 240°. In this case, (3×2×)=−60°. Therefore, 360° is added to this value, whereby 300° is calculated as an absolute angle of the rotation angle of the shaft 103. The embodiments of the present invention are described by using the MR sensor, but the present invention is not limited thereto, and a magnetic sensor using a hole device or a sensor using an optical device may be used.

Process when Failure Occurs

For example, the MR sensor 114 may break down due to break of the MR sensor elements 110, etc. In this case, a calculated value (2×) is not output from the converter unit 122, or a value that does not accurately reflect the rotation angle is output. Therefore, an absolute angle is calculated from a calculated value (3×) output from the RD converter unit 121, based on a data of the absolute angle which is obtained just before a calculated value (2×) cannot be obtained from the converter unit 122 (that is, the output of the absolute angle calculating unit 123). On the other hand, the angular data (3×) may not be output from the RD converter unit 121 due to some problem. In this case, as in the case of the above description, an absolute angle is calculated based on the angular data (2×) output from the converter unit 122.

An example of this process will be described in detail hereinafter. While the angle detecting device operates properly, outputs of the absolute angle calculating unit 123 are stored in the memory unit 124 for a predetermined period. When output is not obtained from one of the converter units (or a signal of abnormal value is output), an absolute angle obtained just before this problem is retrieved from the memory unit 124. Then, a normal calculated value obtained from the other converter unit is converted into an absolute angle based on the retrieved value of the absolute angle after the trouble. According to this method, the absolute angle just before the output is not obtained from one of the converter units has been determined. Therefore, an absolute angle corresponding to a normal calculated value obtained from the other converter unit is determined. Thus, the redundancy is secured when the MR sensor 114 breaks down. This process is performed by the absolute angle calculating unit 123.

Meanwhile, when output is not obtained from one of the converter units or when a signal of abnormal value is output from one of the converter units, the OR circuit 203 in FIG. 2 outputs an error signal. Thus, an occurrence of trouble in the angle detecting system is reported to the outside.

Advantages

In this embodiment, the angle detectors of the resolver and the MR sensor, which are based on different operating functions, are combined. Therefore, the absolute angle can be measured while superior redundancy against failure is obtained. That is, since the resolver and the MR sensor have different operating functions, they have a different failure mode, whereby a probability of the resolver and the MR sensor breaking down at the same time is low in a specific condition. In other words, in a condition in which one of the angle detectors breaks down, the other angle detector may not break down with high probability. Therefore, the probability of the resolver and the MR sensor breaking down at the same time is decreased, and a probability of suddenly not being able to obtain the angular data is decreased. Moreover, the calculation is based on the outputs of the angle detectors with the shaft angle multiplier of not less than 2× which has superior detection accuracy to an angle detector with a shaft angle multiplier of 1×. Accordingly, a data of an absolute angle is obtained at accuracy higher than the detection accuracy of the angle detector with the shaft angle multiplier of 1×. Since the outputs of the two angle detectors have a regular relationship, a calculating unit such as a microcomputer can detect failures in the angle detectors and an error signal output circuit outputs error signal, whereby functional safety is obtained. There may be a case in which the calculating unit is formed so as to have redundancy according to a necessary failure rate.

Other Examples

As the combination of the shaft angle multipliers, the resolver may have a shaft angle multiplier of 5×, and the MR sensor may have a shaft angle multiplier of 4×. That is, when the shaft angle multiplier for the resolver is represented as "n" and for the MR sensor is represented as "m", the combination of the shaft angle multipliers may be set so that the difference between "n" and "m" is 1, The resolver detects with higher accuracy compared with the MR sensor. Therefore, when the MR sensor has a shaft angle multiplier of 4×, the resolver is desirably selected so as to have a shaft angle multiplier of 5×. That is, an angle detector, which detects angles with higher accuracy, is desirably formed so as to have a larger shaft angle multiplier.

Figure 5:
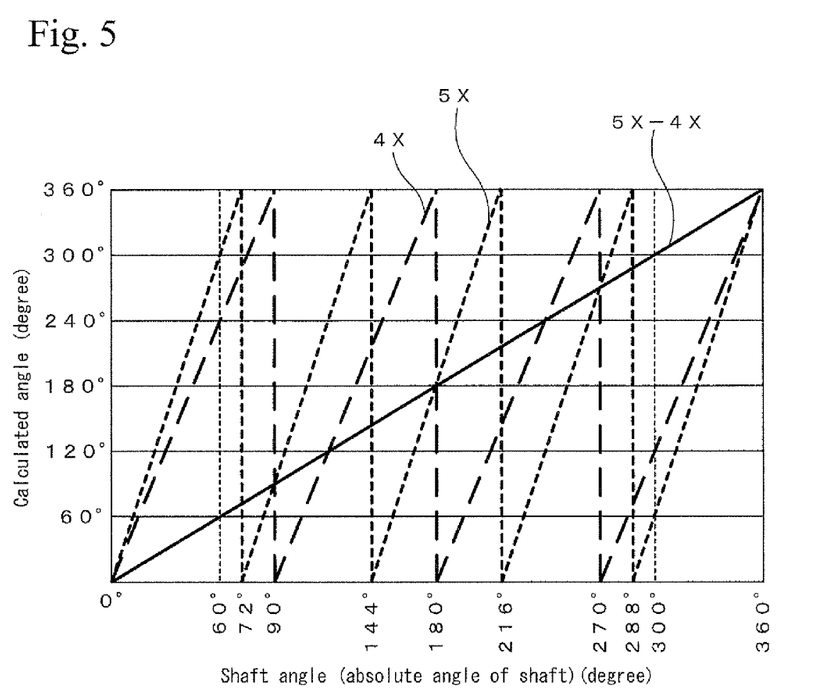
FIG. 5 is a graph showing a relationship between shaft angle and calculated angle that is obtained by a converter.

FIG. 5 shows a relationship between shaft angle and calculated angle in a case of combining a resolver with a shaft angle multiplier of 5× and an MR sensor with a shaft angle multiplier of 4×. In this case, corresponding to the calculated angle of the RD converter unit 121 based on the output of the resolver with the shaft angle multiplier of 5×, shaft angle shown by the horizontal axis is obtained five times per actual rotation. On the other hand, corresponding to the calculated angle of the converter unit 122 based on the output of the MR sensor with the shaft angle multiplier of 4×, shaft angle shown by the horizontal axis is obtained four times per actual rotation. In this case, the absolute angle calculating unit 123 calculates (5×−4×).

An example of the process in the absolute angle calculating unit 123 in the above case will be described hereinafter. For example, a calculated value (5×) of the rotation angle of the shaft 103 output from the RD converter unit 121 may be 300°, and a calculated value (4×) of the rotation angle of the shaft 103 output from the converter unit 122 may be 240°. In this case, (5×−4×)=60° is calculated as an absolute angle of the shaft 103.

For example, a calculated value (5×) of the rotation angle of the shaft 103 output from the RD converter unit 121 may be 60°, and a calculated value (4×) of the rotation angle of the shaft 103 output from the converter unit 122 may be 120°. In this case, (5×−4×)=−60°. Therefore, 360° is added to this value, whereby 300° is calculated as an absolute angle of the shaft 103.

The calculated absolute angle contains errors due to the two angle detectors. When one of the angle detectors has higher accuracy, the absolute angle can be recalculated and converted into an absolute angle containing smaller amount of error components by the following second formula. In the second formula, "a" represents the absolute angle obtained by the microcomputer 109, "n" represents the shaft angle multiplier of the angle detector with higher accuracy, "b" represents an angle calculated from an output of the angle detector with higher accuracy, and "A" represents an absolute angle with high accuracy. A symbol "QUOTIENT" represents a function for showing only an integer by truncating the decimal part of a quotient. This calculation is performed by the absolute angle calculating unit 123.

$$A=\{\text{QUOTIENT}(a/360/n)\times 360+b\}/n \qquad \text{Second Formula}$$

The MR sensor may have a ring-shaped magnet, through which a shaft penetrates, and may have MR sensor elements arranged at a side of the ring-shaped magnet. On the other hand, the microcomputer 109 may be arranged at the outside of the case 101, and the process of the microcomputer 109 may be executed by a control computer at the outside.

The embodiment of the present invention is not limited to each of the above embodiments and may include various modifications that can be anticipated by a person skilled in the art. The effects of the present invention are also not limited to the descriptions described above. That is, various additions, changes, and partial deletions can be performed in a range that does not exceed the general concept and object of the present invention, which are derived from the descriptions recited in the Claim and equivalents thereof.

The present invention can be used for a technique for detecting a rotation angle.

What is claimed is:

1. An angle detecting device configured to detect an angle of a rotating shaft, the angle detecting device comprising:
   a first angle detector including a resolver having a shaft angle multiplier of not less than 2×;
   a second angle detector including an MR (magnetoresistive) sensor having a shaft angle multiplier of not less than 2×, the second angle detector being a different type of detector from the first angle detector, and a difference of the shaft angle multiplier between the first angle detector and the second angle detector is 1; and
   a signal processing section including a calculating unit configured to calculate an absolute angle of a rotation angle of the rotating shaft based on a difference between a first angle and a second angle, the first angle being calculated from an output of the resolver, and the second angle being calculated from an output of the MR sensor, wherein:

the calculating unit is configured to: (i) perform a first process of subtracting the second angle from the first angle when the shaft angle multiplier of the first angle detector is greater than that of the second angle detector, or perform a second process of subtracting the first angle from the second angle when the shaft angle multiplier of the second angle detector is greater than that of the first angle detector, and (ii) output results of the first process or the second process as an absolute angle of the rotation angle of the rotating shaft when the results are zero or positive, or add 360° to results of the first process or the second process when the results are negative and output the obtained values as an absolute angle of the rotation angle of the rotating shaft.

2. The angle detecting device according to claim 1, wherein the signal processing section includes two microcomputers that monitor mutual operation and output signals.

3. The angle detecting device according to claim 2, wherein the signal processing section outputs an error signal when at least one of the signals output from the two microcomputers is abnormal.

4. The angle detecting device according to claim 1 wherein the calculating unit calculates the following first formula:

$$A=\{QUOTIENT(a/360/n) \times 360 + b\}/n \quad \text{First Formula}$$

where "A" represents an absolute angle with high accuracy, "a" represents the absolute angle obtained by the calculating unit, "n" represents the shaft angle multiplier of the angle detector with relatively higher accuracy, "b" represents an angle calculated from an output of the angle detector with relatively higher accuracy, and "QUOTIENT" represents a function for showing only an integer by truncating the decimal part of a quotient.

5. The angle detecting device according to claim 1, wherein the first angle detector and the second angle detector have a coaxial structure and use the same shaft.

6. An angle detecting device configured to detect an angle of a rotating shaft, the angle detecting device comprising:
a first angle detector;
a second angle detector; and
a signal processing section that includes a calculating unit for calculating an absolute angle of a rotation angle of the rotating shaft based on a difference between a first angle and a second angle, the first angle being calculated from an output of the first angle detector, and the second angle being calculated from an output of the second angle detector, wherein:

the first angle detector is of a different type from the second angle detector, the calculating unit performs: (1) a first process by subtracting the second angle from the first angle when the shaft angle multiplier of the first angle detector is greater than that of the second angle detector; or (2) a second process by subtracting the first angle from the second angle when the shaft angle multiplier of the second angle detector is greater than that of the first angle detector, and the calculating unit: (i) outputs results of at least one of the first process and the second process as an absolute angle of the rotation angle of the rotating shaft when the results are zero or positive, or (ii) adds 360° to results of the first process and the second process when the results are negative and outputs the obtained values as an absolute angle of the rotation angle of the rotating shaft.

7. An angle detecting device for detecting angle of a rotating shaft, comprising:
a first angle detector;
a second angle detector; and
a signal processing section that includes a calculating unit for calculating an absolute angle of a rotation angle of the rotating shaft based on a difference between a first angle and a second angle, the first angle being calculated from an output of the first angle detector, and the second angle being calculated from an output of the second angle detector, wherein:

the first angle detector is of a different type from the second angle detector, and the calculating unit calculates the following first formula:

$$A=\{QUOTIENT(a/360/n) \times 360 + b\}/n \quad \text{First Formula}$$

where "A" represents an absolute angle with high accuracy, "a" represents the absolute angle obtained by the calculating unit, "n" represents the shaft angle multiplier of the angle detector with relatively higher accuracy, "b" represents an angle calculated from an output of the angle detector with relatively higher accuracy, and "QUOTIENT" represents a function for showing only an integer by truncating the decimal part of a quotient.

* * * * *